(12) United States Patent
Andri

(10) Patent No.: US 7,805,238 B2
(45) Date of Patent: Sep. 28, 2010

(54) HYBRID VEHICLE PROPULSION SYSTEM UTILIZING KNOCK SUPPRESSION

(75) Inventor: Michael Andri, Portland, OR (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/689,347

(22) Filed: Jan. 19, 2010

(65) Prior Publication Data

US 2010/0116245 A1 May 13, 2010

Related U.S. Application Data

(63) Continuation of application No. 11/837,396, filed on Aug. 10, 2007, now Pat. No. 7,676,321.

(51) Int. Cl.
G06F 19/00 (2006.01)
F02B 7/02 (2006.01)
F02M 43/00 (2006.01)
B60W 10/06 (2006.01)

(52) U.S. Cl. ........... 701/104; 123/304; 123/431; 123/436; 123/575; 180/65.28; 701/111

(58) Field of Classification Search ............ 123/295, 123/299, 300, 304, 305, 431, 435, 436, 478, 123/480, 575, 1 A; 701/101–105, 111, 115; 60/601; 180/65.28; 903/905
See application file for complete search history.

(56) References Cited

U.S. PATENT DOCUMENTS

| | | | | |
|---|---|---|---|---|
| 2,221,405 A * | 11/1940 | Nallinger | ............ | 123/559.1 |
| 3,383,190 A * | 5/1968 | Weber | ............ | 123/434 |
| 3,589,348 A * | 6/1971 | Reichhelm | ............ | 123/169 PB |
| 3,794,000 A * | 2/1974 | Hodgkinson | ............ | 123/557 |
| 4,031,864 A * | 6/1977 | Crothers | ............ | 123/1 A |
| 4,136,652 A * | 1/1979 | Lee | ............ | 123/514 |
| 4,205,650 A * | 6/1980 | Szwarcbier | ............ | 123/146.5 A |
| 4,256,075 A * | 3/1981 | Fukui et al. | ............ | 123/478 |
| 4,311,118 A * | 1/1982 | Slagle | ............ | 123/25 A |
| 4,325,329 A * | 4/1982 | Taylor | ............ | 123/3 |
| 4,364,370 A * | 12/1982 | Smith et al. | ............ | 123/575 |
| 4,402,296 A * | 9/1983 | Schwarz | ............ | 123/575 |
| 4,411,243 A * | 10/1983 | Hardenberg et al. | ............ | 123/577 |
| 7,438,664 B2 * | 10/2008 | Saito | ............ | 477/3 |
| 7,578,281 B2 * | 8/2009 | Russell et al. | ............ | 123/304 |
| 7,640,912 B2 * | 1/2010 | Lewis et al. | ............ | 123/304 |
| 7,676,321 B2 * | 3/2010 | Andri | ............ | 701/104 |
| 2009/0038585 A1* | 2/2009 | Andri | ............ | 123/406.3 |
| 2009/0321159 A1* | 12/2009 | Andri | ............ | 180/65.25 |
| 2009/0321164 A1* | 12/2009 | Andri | ............ | 180/65.265 |

* cited by examiner

Primary Examiner—Willis R Wolfe, Jr.
(74) Attorney, Agent, or Firm—Allan J. Lippa; Alleman Hall McCoy Russell & Tuttle LLP

(57) ABSTRACT

A hybrid propulsion system for a vehicle and method of operation are provided. As one example, the system comprises an engine including at least one combustion chamber, a motor configured to selectively propel the vehicle via the drive wheel, a fuel system configured to deliver a first substance and a second substance to the combustion chamber in varying relative amounts, wherein the first substance includes a fuel and the second substance includes a greater concentration of a knock suppressing substance than the first substance; and a control system configured to operate the fuel system to vary the relative amounts of the first substance and the second substance delivered to the combustion chamber in response to an operating condition while operating the motor to propel the vehicle.

15 Claims, 7 Drawing Sheets

HYBRID VEHICLE PROPULSION SYSTEM UTILIZING KNOCK SUPPRESSION

CROSS REFERENCE TO RELATED APPLICATION

The present application is a continuation of U.S. patent application Ser. No. 11/837,396, filed Aug. 10, 2007, entitled "Hybrid Vehicle Propulsion System Utilizing Knock Suppression," the entire contents of which is incorporated herein by reference.

BACKGROUND AND SUMMARY

Engines have been described utilizing multiple injector locations with different fuel types. One example is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describe directly injecting ethanol to improve charge cooling effects, while relying on port injected gasoline for providing the majority of combusted fuel over a drive cycle. Thus, it has been demonstrated that the selective use of a knock suppressing substance such as ethanol with gasoline fueled engines can reduce knock during boosted operation, particularly where the engine may otherwise be knock limited.

The inventor of the present application has recognized various issues with the above approach. As one example, the engine output may be significantly reduced where the availability of the knock suppressing substance on-board the vehicle is low. For example, even when the engine has sufficient fuel reserves remaining on-board the vehicle, the depletion of the knock suppressing substance may once again cause the engine to be knock limited, thereby reducing the level of boost that may be provided to the engine. This reduction in engine output, under some conditions, may surprise the vehicle operator or may cause dissatisfaction with the performance of the vehicle.

As another example, where the knock suppressing substance is separated on-board the vehicle from a fuel mixture, the consumption of the knock suppressing substance at a rate that is greater than the separation rate may likewise cause the knock suppressing substance to eventually become exhausted. Thus, the vehicle operator may attempt or may be unable to initiate a vehicle control operation that is no longer practicable due to the reduced availability the knock suppressing substance. Alternatively, with each of the above examples, if the engine is instead permitted to be operated in a state where knock occurs without the use of the knock suppressing substance, engine damage may occur, or noise and vibration harshness (NVH) as a result of the engine knock may again cause dissatisfaction with the vehicle operator.

In response to at least the above issues, the inventor has provided as one example, a hybrid propulsion system for a vehicle including at least one drive wheel. The system comprises an engine including at least one combustion chamber; a motor configured to selectively propel the vehicle via the drive wheel; a fuel system configured to deliver a first substance and a second substance to the combustion chamber in varying relative amounts, wherein the first substance includes a fuel and the second substance includes a greater concentration of a knock suppressing substance than the first substance; and a control system configured to operate the fuel system to vary the relative amounts of the first substance and the second substance delivered to the combustion chamber in response to an operating condition while operating the motor to propel the vehicle.

Additionally, the inventor has provided, as another example, a method of operating a hybrid vehicle propulsion system including an engine and a motor coupled to at least a drive wheel of the vehicle. The method comprises delivering gasoline and alcohol to the engine in varying relative amounts responsive to an operating condition; varying an amount of energy stored in an energy storage device operatively coupled to the motor responsive to a condition of the fuel system.

In this way, the utilization of a knock suppressing substance such as an alcohol can be coordinated with other sources of vehicle propulsion, including an electric motor or other suitable drive motor, enabling a more consistent drive feel for the vehicle operator for a variety of operating conditions, such as where the availability of the knock suppressing substance or the amount of energy stored by the motor's energy storage device are reduced.

DETAILED DESCRIPTION

Figure 1:
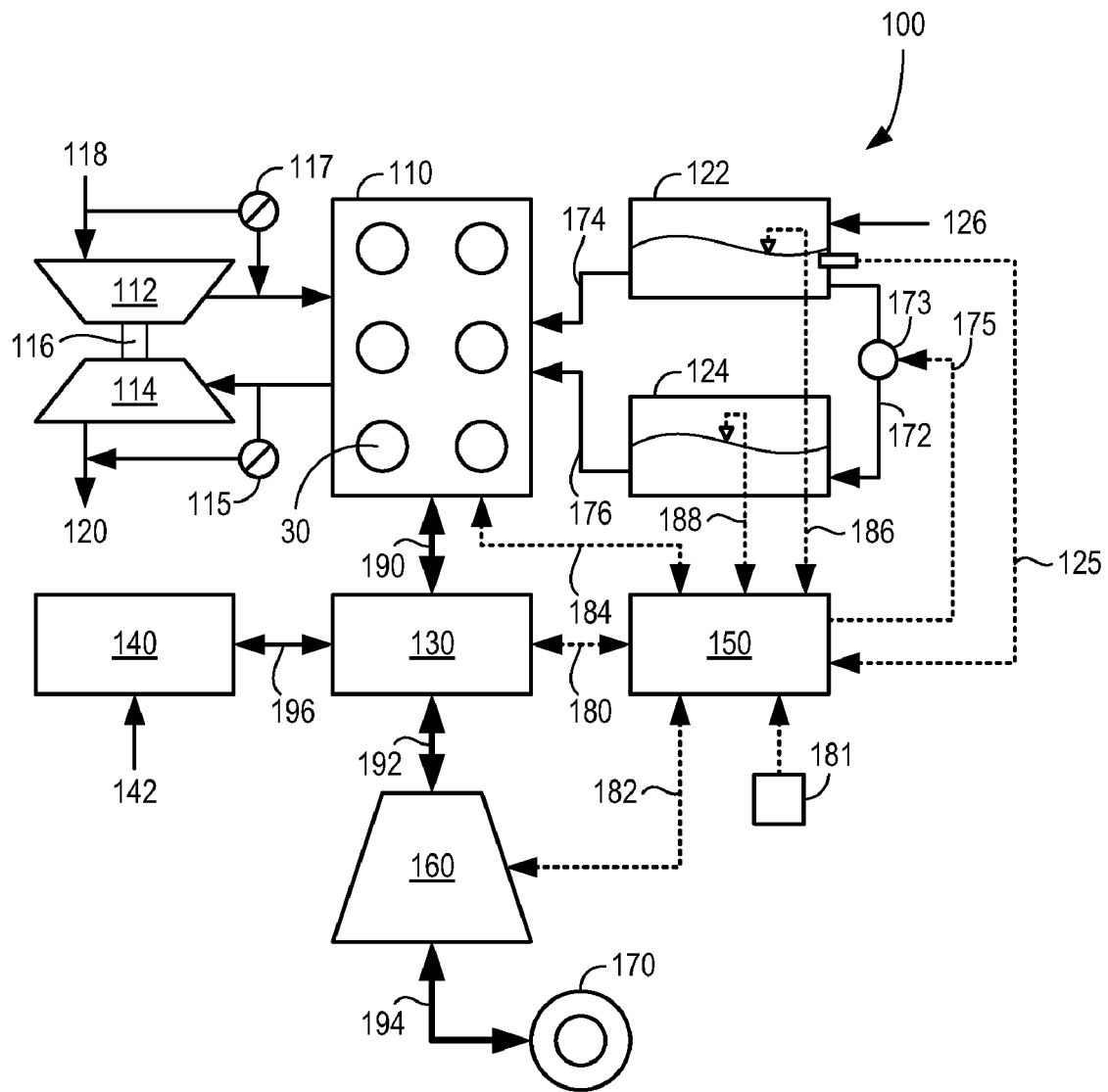
FIG. 1 schematically shows an example hybrid propulsion system for a vehicle.

FIG. 1 schematically shows an example hybrid propulsion system 100 for a vehicle. Propulsion system 100 includes an engine 110 and a motor 130, each configured to selectively provide propulsive effort to at least one or more drive wheels 170 of the vehicle via a transmission 160, as indicated at 190, 192, and 194. Further, engine 110 and motor 130 can each also selectively receive energy from drivel wheel 170 in order to provide what may be referred to as regenerative braking of the vehicle. It should be appreciated that engine 110 and motor 130 can be arranged in a parallel or a series configuration to enable one or both of the engine and motor to supply or receive torque from drive wheel 170. Thus, the example shown in FIG. 1 should not be limited to a particular hybrid vehicle configuration. For example, propulsion system 100 may include two or more motors in other examples, and/or may include motor 130 positioned on an opposite side of transmission 160 from engine 110. As yet another example, engine 110 may be instead uncoupled from the drivetrain, wherein the engine may be selectively operated to generate energy that is usable by motor 130 for propelling the vehicle. As one non-limiting example, motor 130 may include an electric motor that can be supplied energy to provide torque and can be operated to generate electrical energy responsive to an input torque.

Propulsion system 100 may also include an energy storage device 140 communicating with motor 130 as indicated at 196. As one example, propulsion system 100 may be configured as a hybrid electric vehicle (HEV), wherein energy storage device 140 include one or more batteries or capacitors for storing electrical energy. Thus, as shown in FIG. 1, motor 130 can receive energy from energy storage device 140 or supply energy to energy storage device 140 as indicated at 196. Further, energy storage device 140 can receive energy from energy sources external the vehicle as indicated at 142. For example, propulsion system 100 may be configured as a plug-in hybrid electric vehicle, wherein energy storage device 140 can be connected to an external electrical energy supply via a suitable wire or cable to enable recharging of the energy storage device.

Engine 110 is shown in FIG. 1 including a plurality of cylinders or combustion chambers 30. Engine 110 can receive intake air from ambient as indicated at 118 via a compressor 112, under select operating conditions. During other conditions, at least a portion of the intake air can bypass the compressor by way of a compressor bypass valve 117. In the particular example shown in FIG. 1, compressor 112 is powered by a turbine 114 arranged in an exhaust passage of the engine in a configuration that may be referred to as a turbocharger. Turbine 114 is shown coupled to compressor 112 via a shaft 116. Engine 110 can exhaust gases produced by the engine via an exhaust passage including turbine 114 during some conditions in order to power compressor 112. During other conditions, exhaust gases can bypass the turbine by way of a turbine bypass valve 115. However, in other examples, compressor 112 can be powered by the engine or motor without requiring a turbine in a configuration that may be referred to as a supercharger. Thus, compressor 112 may be configured to provide boosted intake air to the engine with or without an exhaust gas turbine. In this way, each of the engine cylinders can receive intake air from ambient as indicated at 118 and exhaust products of combustion to ambient as indicated at 120.

Engine 110 can also selectively receive two substances as indicated at 174 and 176. As one example, a first substance including a fuel or a fuel mixture may be delivered to the engine cylinders, as indicated at 174. For example, the first substance may include a fuel such as gasoline, diesel, or a mixture of fuel and other substances. A second substance, different than the first substance, may be delivered to the engine cylinders, as indicated at 176. As one non-limiting example, the second substance may include a greater concentration of a knock suppressing substance than the first substance. For example, the knock suppressing substance selectively delivered to the engine, as indicated at 176, may include an alcohol such as ethanol or methanol, or may include water, as another example. However, as indicated with regards to the first substance, a fuel delivered to the engine as indicated at 174 may also include the knock suppressing substance at a lower concentration than the second substance. Thus, it should be appreciated that the first and second substances may include similar components of different concentrations. As one particular non-limiting example, the first substance selectively provided to the engine, as indicated at 174, includes liquid gasoline or a mixture of liquid gasoline and ethanol, and the second substance selectively provided to the engine, as indicated at 176, includes at least liquid ethanol. As will be described in greater detail herein, the knock suppressing substance may be selectively used at certain operating conditions to reduce the occurrence or likelihood of engine knock.

FIG. 1 further shows how the first substance may be separately delivered to the engine from a first storage tank 122 and the second substance may be separately delivered to the engine from a second storage tank 124. In this particular example, first storage tank 122 can receive a fuel mixture as indicated at 126, for example, during a refueling operation. The fuel mixture received at first storage tank 122 may include both a fuel and a knock suppressing substance. For example, the fuel mixture received at first storage tank 122 as indicated at 126 may include a mixture of gasoline and ethanol such as E85 which is approximately 85% ethanol and 15% gasoline; a mixture of gasoline and methanol such as M85 which is approximately 85% methanol and 15% gasoline; a mixture of gasoline and water; a mixture of an alcohol, water, and gasoline; mixtures of diesel and water; mixtures of diesel and an alcohol; or other suitable mixtures including a fuel and a knock suppressing substance that suppresses knock to a greater extent than the fuel contained in the fuel mixture. Further still, it should be appreciated that the fuel mixture received via 126 can include varying ratios of the fuel and the knock suppressing substance between different fueling stations. Thus, the system described herein may be configured to provide improved and more consistent propulsion system output for a given vehicle operator input for a range of fuel mixtures and availabilities of the knock suppressing substance contained in the fuel mixture.

As one non-limiting example, the fuel mixture received at 126 may include a mixture of gasoline and ethanol in liquid form. At least some of the knock suppressing substance (e.g. ethanol) may be separated from the fuel mixture (e.g. gasoline and ethanol) via a separator 173 and passage 172. Separator 173 may also include a pump to enable separation of the knock suppressing substance from the fuel mixture and to enable transport of the knock suppressing substance from tank 122 to tank 124 via passage 172. However, in some embodiments, tank 124 may be omitted, whereby the knock suppressing substance is provided directly to engine 110 via separator 173. In other embodiments, a third storage tank may be provided, whereby the fuel mixture is initially received at a first storage tank, whereby the first substance and the second substance are separated to second and third tanks, respectively. In still other embodiments, tanks 122 and 124 may be separately filled with a first substance and a second substance, respectively, thereby not requiring separation of a fuel mixture including the first and the second substances. Regardless of the particular fuel system configuration, it should appreciated that a first and a second substance may be provided to at least one cylinder of the engine in varying relative amounts in response to operating conditions.

Propulsion system 100 may include a control system 150. Control system 150 may be communicatively coupled to various components of propulsion system 100 to enable the control routines described herein. For example, as shown in FIG. 1, control system 150 can receive an indication of the amount of the first substance stored in tank 122 from a sensor as indicated at 186 and can receive an indication of the amount of the second substance stored in tank 124 from a sensor as indicated at 188. Further, in some examples, control system 150 can receive an indication of the concentration of the second substance (e.g. a knock suppressing substance) contained within the first substance stored in tank 122 as indicated at 125.

Figure 2:
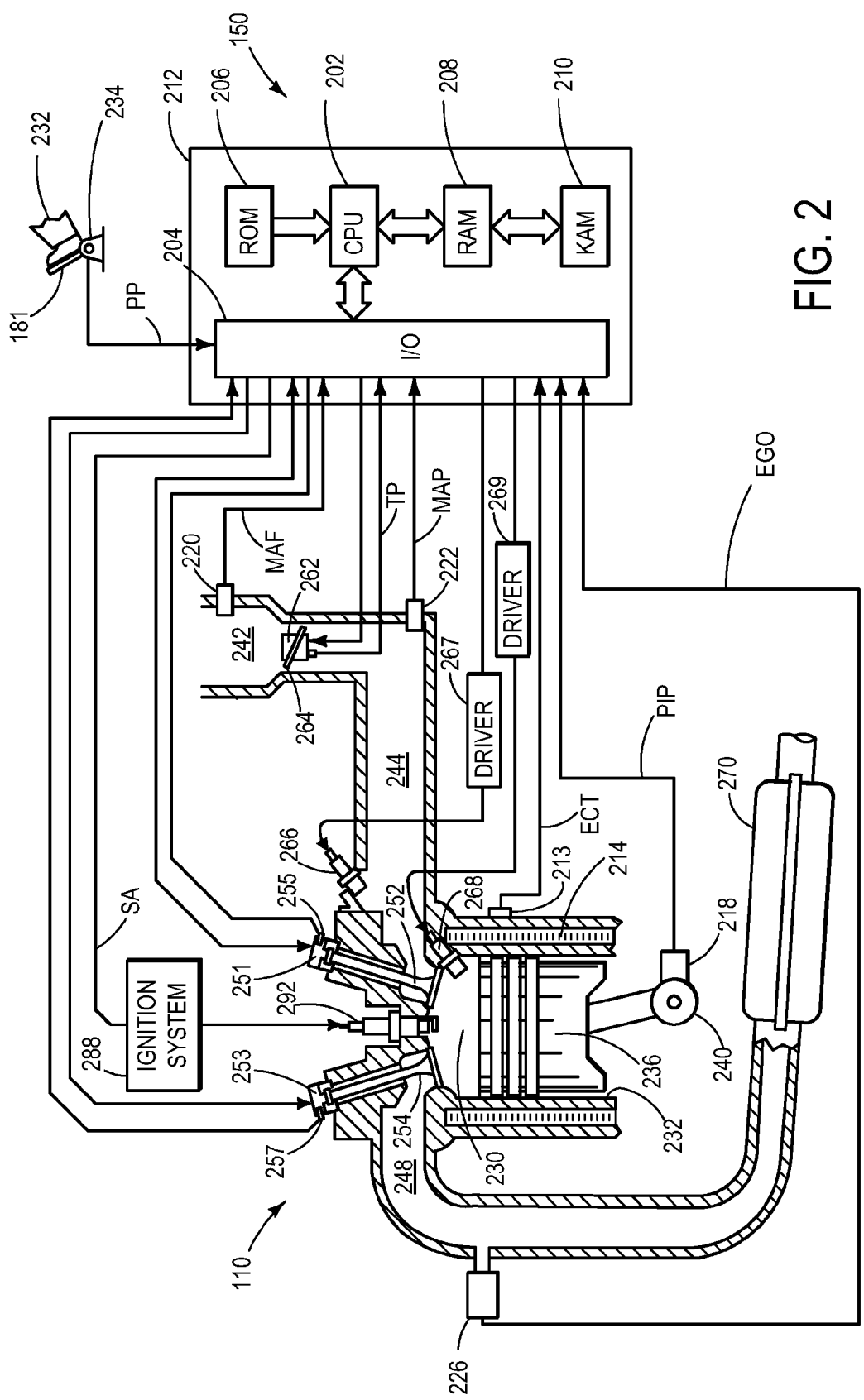
FIG. 2 schematically shows an example engine cylinder of the propulsion system shown in FIG. 1.

Control system 150 can also receive a user input signal from a user input device 181, which is shown in greater detail in FIG. 2. As one example, user input device 181 may include an accelerator pedal that is configured to enable a vehicle operator to control the acceleration and speed of the vehicle. Control system 150 can also receive various other inputs shown in FIG. 2 in addition to those shown in FIG. 1.

In response to the various inputs received by the control system, control system 150 can control the operation of transmission 160 and receive operation condition information from transmission 160 as indicated at 182. For example, control system 150 can vary the gear ratio provided by the transmission and/or lock or unlock a torque converter provided with the transmission. Control system 150 can also control the operation of engine 110 and receive operation condition information from engine 110 as indicated 184 and as further described with reference to FIG. 2. Control system 150 can also control the operation of motor 130 and/or energy storage device 140, and receive operating condition information from these devices as indicated at 180. Control system 150 can control the rate of separation provided by separator 173 as indicated at 175. In addition to the various control paths shown in FIG. 1, control system 150 can control the operation of compressor 112, turbine 114, and the position of bypass valves 115 and 117. As one example, turbine 114 may be configured as a variable geometry turbine (VGT), whereby the geometry of the turbine may be controlled by control system 150 to vary the amount of boost provided to the engine by compressor 112.

FIG. 2 schematically shows an example cylinder 30 of engine 110 of the propulsion system 100 shown in FIG. 1. As shown in FIG. 1, engine 110 may be controlled by a control system 150. Control system 150 may include an electronic controller 212 configured to control the operation of engine 110 responsive to input received from a vehicle operator 232 via an input device 181. In this example, input device 181 includes an accelerator pedal and a pedal position sensor 234 for generating a proportional pedal position signal PP. Combustion chamber (i.e. cylinder) 30 of engine 110 may include combustion chamber walls 232 with piston 236 positioned therein. Piston 236 may be coupled to crankshaft 240 so that reciprocating motion of the piston is translated into rotational motion of the crankshaft. Crankshaft 240 may be coupled to at least one drive wheel of a vehicle via an intermediate transmission system, for example, as shown in FIG. 1. Further, a starter motor may be coupled to crankshaft 40 via a flywheel to enable a starting operation of engine 110. As one non-limiting example, motor 130 shown in FIG. 1 may be operatively coupled to crankshaft 240 to enable torque to be exchanged between the engine and the motor.

Combustion chamber 230 can receive intake air from intake manifold 244 via intake passage 242 and can exhaust combustion gases via exhaust passage 248. As shown in FIG. 1, combustion chamber 30 can receive boosted intake air from ambient via a boosting device such as a compressor and can exhaust gases via exhaust passage 48 including a turbine. Alternatively, the compressor and/or turbine may be at least partially bypassed to enable at least one way in which the amount of boost provided to the cylinder may be varied. Intake manifold 244 and exhaust passage 248 can selectively communicate with combustion chamber 230 via respective intake valve 252 and exhaust valve 254. In some embodiments, combustion chamber 230 may include two or more intake valves and/or two or more exhaust valves.

As one non-limiting example, the position of intake valve 252 may be controlled by controller 212 via an electric or electromagnetic valve actuator (EVA) 251. Similarly, the position of exhaust valve 54 may be controlled by controller 212 via EVA 253. During some conditions, controller 212 may vary the signals provided to actuators 251 and 253 to control the opening and closing of the respective intake and exhaust valves. The position of intake valve 252 and exhaust valve 254 may be determined by valve position sensors 255 and 257, respectively. In alternative embodiments, one or more of the intake and exhaust valves may be actuated by one or more cams, and may utilize one or more of what may be referred to as cam profile switching (CPS), variable cam timing (VCT), variable valve timing (VVT) and/or variable valve lift (VVL) systems to vary valve operation. For example, cylinder 230 may alternatively include at least an intake or exhaust valve controlled via cam actuation including one or more of CPS, VCT, VVT, and/or VVL. Thus, it should be appreciated that engine 110 should not be limited to the various valve system configurations described herein by way of example.

Further, combustion chamber 30 may be configured with a first injector 266 and a second injector 268. The first injector may be configured to provide a first substance to the combustion chamber as indicated schematically as 174 of FIG. 1 responsive to a signal supplied by electronic driver 267. The second injector may be configured to provide a second substance to the combustion chamber as indicated schematically as 176 of FIG. 1 responsive to a signal supplied by electronic driver 269. As one non-limiting example shown in FIG. 2, the first injector 266 may be arranged along intake manifold 44 in a configuration that may be referred to as port injection and the second injector 268 may be coupled directly to combustion chamber 30 in a configuration that may be referred to as direct injection. However, it should be appreciated that in other examples, injector 266 may also be configured as a direct injector or injector 268 may also be configured as a port injector. Alternatively, a single direct injector may be utilized to provide varying relative amounts of first and second substances directly to the combustion chamber by way of a mixing valve arranged upstream of the injector. Thus, some or all of the cylinders of engine 110 may be configured to receive a fuel and/or other substance (e.g. a knock suppressing substance) in varying ratios depending on operating conditions.

As shown in FIG. 1, some or all of the cylinders of engine 110 can separately receive a first substance and a second substance in different relative amounts. For example, the first substance may include a fuel or fuel mixture including gasoline, diesel, or other suitable fuel, while the second substance may include a greater concentration of a knock suppressing substance than the first substance. For example, the second substance may include a greater concentration of alcohol or water than the first substance. Thus, in at least one embodiment, injector 266 may be configured to provide a first substance including gasoline to combustion chamber 30 via port injection and injector 268 may be configured to provide a second substance including a greater concentration of ethanol than the first substance to combustion chamber 30 via direct injection. In still other examples, a first and a second substance may be selectively provided to combustion chamber 30 in varying relative amounts via a single direct or port injector, for example, by utilizing a mixing valve arranged upstream of the single injector. Thus, it should be appreciated that the control system described herein may be configured to vary the absolute and/or relative amounts of a first substance such as gasoline and a second substance such as ethanol delivered to the combustion chamber responsive to operating conditions such as engine load, engine speed, engine output, or an indication of knock, among others.

Intake passage 242 may include a throttle 262 having a throttle plate 264. In this particular example, the position of throttle plate 264 may be varied by controller 212 via a signal provided to an electric motor or actuator included with throttle 262, a configuration that may be referred to as electronic throttle control (ETC). In this manner, throttle 262 may be operated to vary the flow rate of intake air provided to combustion chamber 30 among other engine cylinders and the pressure within intake manifold 244. The position of throttle plate 264 may be provided to controller 212 by throttle position signal TP. It should be appreciated that the throttle may be arranged along the intake passage upstream or downstream of the compressor. Intake manifold 242 may include a mass air flow sensor 220 and a manifold air pressure sensor 222 for providing respective signals MAF and MAP to controller 212. As one example, manifold air pressure sensor 222 may be arranged downstream of the compressor to enable the control system assess the level of boost provided by the boosting device.

Ignition system 288 can be operated to provide an ignition spark to combustion chamber 30 via spark plug 292 in response to spark advance signal SA from controller 212, under select operating conditions. Though spark ignition components are shown, in some embodiments, combustion chamber 30 or one or more other combustion chambers of engine 110 may be operated in a compression ignition mode, with or without an ignition spark.

Exhaust gas sensor 226 is shown coupled to exhaust passage 248 upstream of emission control device 270. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 270 is shown arranged along exhaust passage 248 downstream of exhaust gas sensor 226. Device 270 may include a three way catalyst (TWC), NOx trap, various other emission control devices, or combinations thereof. In some embodiments, during operation of engine 110, emission control device 270 may be periodically reset or purged by operating at least one cylinder of the engine within a particular air/fuel ratio range.

Controller 212 is shown in FIG. 1 as a microcomputer, including microprocessor unit 202, input/output ports 204, an electronic storage medium for executable programs and calibration values shown as read only memory chip 206 in this particular example, random access memory 208, keep alive memory 210, and a data bus. As described with reference to FIG. 1, control system 150 including controller 212 can exchange control signals with various components of the propulsion system. In addition to those previously described, controller 212 can send and receive various control signals including a measurement of inducted mass air flow (MAF) from mass air flow sensor 220; engine coolant temperature (ECT) from temperature sensor 213 coupled to cooling sleeve 214; a profile ignition pickup signal (PIP) from Hall effect sensor 218 (or other type) coupled to crankshaft 240; throttle position (TP) from a throttle position sensor; and absolute manifold pressure signal, MAP, from sensor 222. Engine speed signal, RPM, may be generated by controller 212 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft.

As described above, FIG. 1 shows only one cylinder of multi-cylinder engine 110, and that each cylinder may similarly include its own set of intake/exhaust valves, fuel injectors, spark plug, etc.

Figure 3:
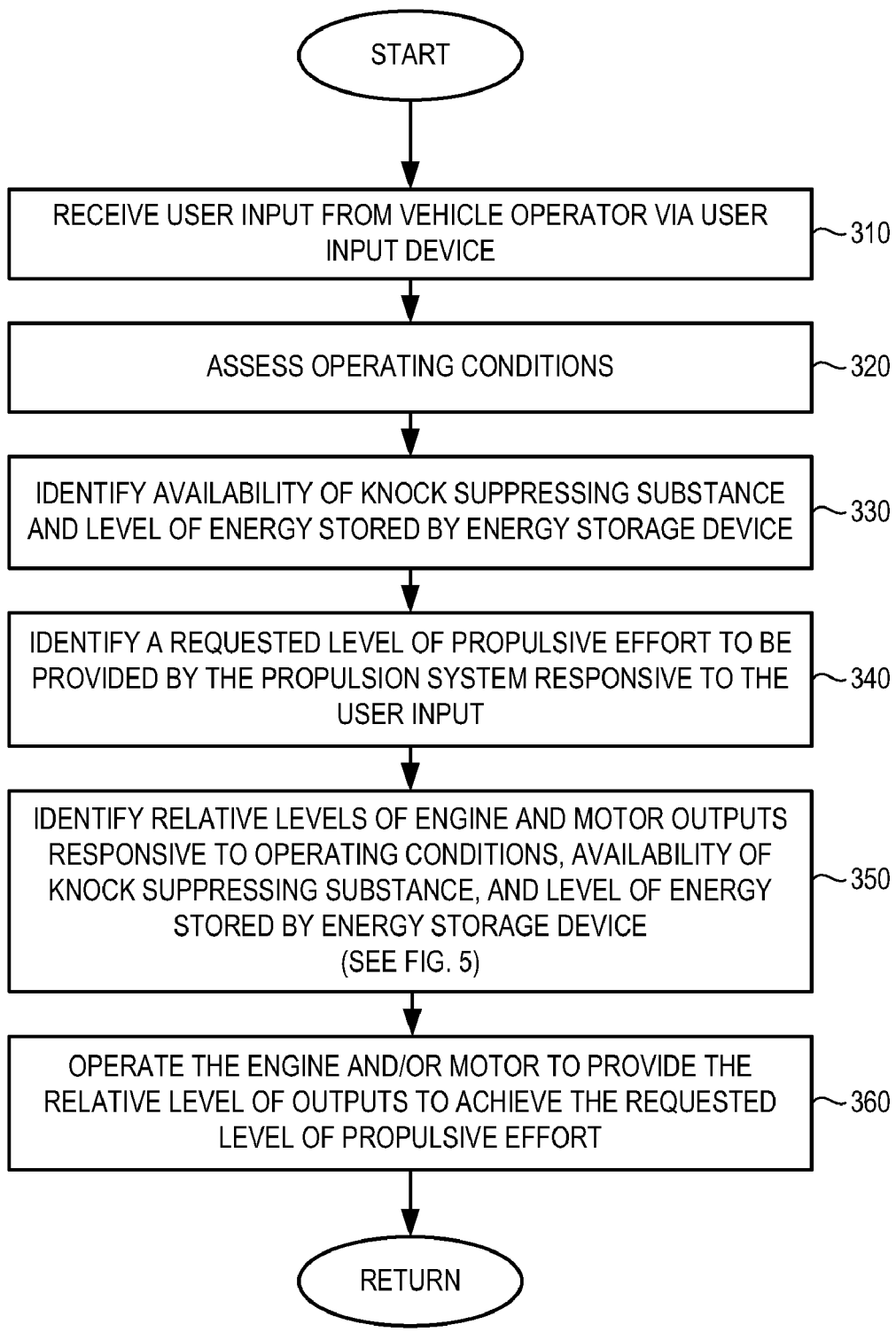
FIG. 3 shows a flow chart depicting an example control strategy for a hybrid propulsion system.

FIG. 3 shows a flow chart depicting an example control strategy for a hybrid propulsion system, such as the propulsion system described with reference to FIGS. 1 and 2. The approaches described with reference to FIG. 3 may be used to coordinate the various hybrid propulsion system components to meet the level of propulsive effort requested by the vehicle operator while also managing the limited resources stored on-board the vehicle such as the knock suppressing substance, fuel, and electrical energy stored by the energy storage device.

At 310, the control system can receive a user input, for example, via user input device 181. For example, the vehicle operator can request an increase or decrease in the level of propulsive effort provided by the vehicle propulsion system by way of input device 181. At 320, the control system can assess the past, present, and/or future predicted operating conditions associated with the vehicle propulsion system. As described herein, operation conditions can include any suitable operating condition of the vehicle propulsion system including one or more of the following: engine load; engine output including speed, torque, power, etc.); engine temperature; ambient air temperature humidity, and pressure; the amount of each substance available to the engine for example, as indicated at 186 and 188; the relative amounts of each substance provided to the engine as indicated at 174 and 176; the concentration of each substance stored within the relevant storage tank, for example, as indicated at 125; conditions of a boosting device coupled to the engine such as turbocharger or supercharger shaft speed, position of the variable geometry turbine actuators, the position of bypass valves 117 and 115, the level of boost provided to the engine, etc.; intake manifold pressure; intake manifold temperature; throttle position; vehicle speed; the output of motor 130 including speed, torque, power, etc.; the temperature of motor 130; the level of energy consumed by motor 130; the temperature of energy storage device 140 and/or motor 130; the level of energy stored by energy storage device 140; a state of transmission 160 as indicated by 182 including the selected gear ratio, torque converter state, transmission temperature; user inputs (e.g. via input device 181); catalyst conditions; air/fuel ratio as measured by an exhaust gas sensor; an indication of knock provided by a knock sensor coupled to the engine; among other control signals, sensors, and operating conditions described herein.

At 330, the control system can identify an availability of the knock suppressing substance (e.g. the amount of the knock suppressing substance stored on board the vehicle) and a level of energy stored by the energy storage device. For example, the control system can assess an availability of the knock suppressing substance stored in tank 124 as indicated at 188 and a state of charge (SOC) of energy storage device 140. However, as described with reference to FIG. 6, the control system may differentiate the amount of the knock suppressing substance that is currently available to the engine (e.g. already separated from the fuel mixture by the separator) from the amount of the knock suppressing substance that will be available to the engine at a future time (e.g. after separation from the fuel mixture via the separator).

At 340, the control system can identify a requested level of propulsive effort to be provided by the propulsion system responsive to the user input. For example, the control system may consider the position of the user input device and/or a rate of change of the position of the user input device to determine a requested level of propulsion to be provided by the hybrid vehicle propulsion system. As one non-limiting example, the control system may reference a look-up table or map stored in memory to determine the total requested level of propulsive effort to be provided responsive to the input received at the user input device.

Figure 5:
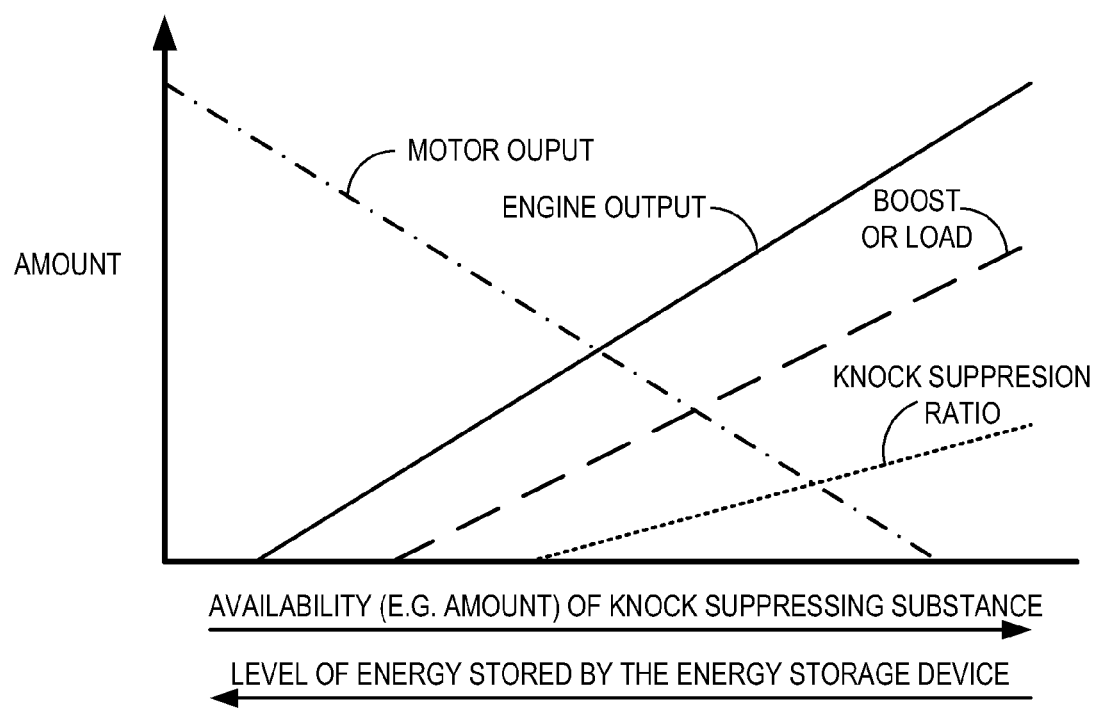
FIG. 5 shows a graph depicting an example embodiment of the control strategies of FIGS. 3 and 4.

At 350, the control system may identify relative levels of engine and motor outputs for providing the total requested level of propulsive effort responsive to the operating conditions assessed at 312, the availability of the knock suppressing substance, the level of energy stored by the energy storage device, and/or the magnitude of the total requested level of propulsive effort to be provided by the propulsion system. As one example, the control system may reference a look-up table or map stored in memory to determine the relative levels of motor and engine output. FIG. 5 provides an example of a map that may be used by the control system to identify the relative level of propulsive effort to be provided by the engine and the motor for some example operating conditions.

As one non-limiting example, the control system may seek to maintain the level of separated knock suppressing substance that is currently available for injection and/or the level of energy stored in the energy storage device at a specific set-point or within a particular range. For example, where the level of knock suppressing substance is less than a prescribed set-point or desired operating range, the engine output portion of the total propulsive effort to be provided by the propulsion system may be reduced relative to the motor output portion. In this way, the amount of knock suppressing substance that is currently available for injection at the engine can be increased via additional separation from the fuel mixture, while still providing the total requested propulsive effort by supplementing the reduction in engine output with additional motor output. As another example, where the level of energy stored by the energy storage device (e.g. battery SOC) is below a set-point or prescribed operating range, the motor output portion may be reduced relative to the engine output portion. In this way, the engine output may be increased by providing additional engine boosting with a corresponding increase in knock suppressing substance delivered to the engine to supplement the reduction in motor output.

At 360, the control system may operate the engine and/or the motor to provide the relative output levels identified at 350 to achieve the total requested propulsive effort identified at 340. Finally, the routine may return. In this way, the control system can coordinate the vehicle operator's request with the various components capable of delivering propulsive effort to the drive wheel to achieve the total propulsive effort requested by the vehicle operator, while also managing the level of knock suppressing substance and energy usable by the motor that stored on-board the vehicle.

While FIG. 3 describes an operation where the engine and/or motor are providing positive torque to the drive wheel responsive to the user input device, it should be appreciated that in other conditions, the engine and/or motor may be operated to provide negative torque to the drive wheel responsive to a second user input device, such as a brake pedal. Thus, the negative torque generated by the engine and/or the motor may be used to provide vehicle braking, whereby the relative levels of negative torque provided by the engine and motor may be varied by the control system responsive to operating conditions.

Figure 4:
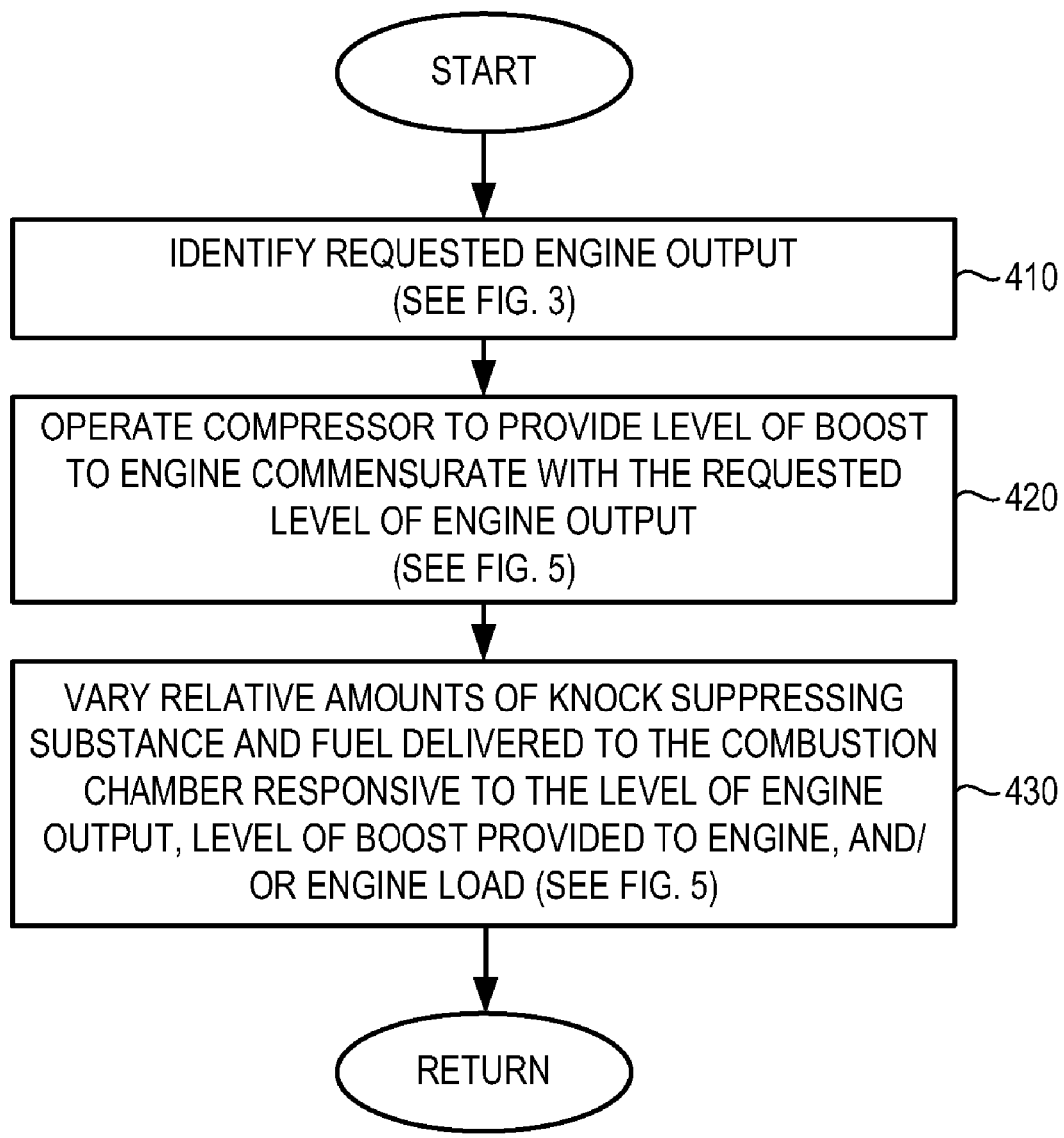
FIG. 4 shows a flow chart depicting an example control strategy for an engine of a hybrid propulsion system.

FIG. 4 shows a flow chart depicting an example control strategy for engine 110 of hybrid propulsion system 100. At 410, the control system may identify the requested engine output, for example, as directed by FIG. 3. At 420, the control system can operate the compressor (i.e. boosting device) to provide a level of boost to the engine that is commensurate with the requested engine output. In other words, the level of boost provided by the boosting device may be controlled to enable the engine to provide the requested engine output, for example, as directed by FIG. 5. Note that the level of boost provided by the compressor may be limited or reduced where the knock suppressing substance is unavailable, based on the relative amounts of the first and second substances delivered to the combustion chamber, and/or where there is an indication of engine knock.

At 430, the control system can vary the relative amounts of the first and second substance that are delivered to each combustion chamber of the engine. For example, the amount of the knock suppressing substance delivered to a combustion chamber of the engine may be increased relative to the first substance (e.g. a fuel) with increasing levels of boost, engine load, and/or engine output to reduce the likelihood or occurrence of engine knock. In this way, engine 110 may be boosted above levels that would be otherwise knock limited without the addition of the knock suppressing substance. Finally, the routine may return.

FIG. 5 shows a graph depicting an example embodiment of the control strategies described herein with reference to FIGS. 3 and 4. As shown in FIG. 5, the horizontal axis of the graph indicates, from left to right, an increasing availability of the knock suppressing substance, and further indicates, from right to left, an increasing level of energy stored by the energy storage device (e.g. SOC). The vertical axis of the graph indicates an amount of each of the motor output, engine output, level of boost provided by the boosting device, and the knock suppression ratio delivered to the engine. As described herein, the knock suppression ratio includes an amount of the second substance including the knock suppressing substance delivered to the engine relative to an amount of the first substance including at least a fuel. Thus, as the knock suppression ratio increases, a greater relative amount of the knock suppressing substance is provided to the engine with respect to the amount of fuel. It should be appreciated that the relative amounts of the engine output, motor output, knock suppression ratio, and boost are not necessarily depicted to scale and that the graph of FIG. 5 provides just one example of how at least these four variables may be adjusted in response to changing operating conditions.

As one example, the graph of FIG. 5 shows how these variables can change for a fixed user input. For example, the engine output portion of the total propulsive effort provided by the propulsion system may be increased relative to the motor output portion with increasing availability of the knock suppressing substance and/or decreasingly levels of energy stored by the energy storage device (e.g. battery SOC) for a given total requested propulsive effort. Conversely, the motor output portion may be increased relative to the engine output portion with decreasing availability of the knock suppressing substance and/or an increasing level of energy stored by the engine storage device for a given total requested propulsive effort. Thus, as shown in FIG. 5, the engine and motor may be selectively operated based on their respective energy resources available on-board the vehicle.

FIG. 5 also shows how the level of boost provided to the engine may be increased with increasing engine output. For example, the boosting device (e.g. compressor) can be operated to increase the intake manifold pressure, thereby increasing engine load, which in turn can be used to advantage by the engine to increase engine output. Further, the knock suppression ratio may also be increased with increasing engine output, engine load, and/or boost to provide a greater relative amount of knock suppressing substance to the engine, thereby providing greater knock suppression at higher engine outputs, engine loads, and levels of boosting. As one non-limiting example, the rate at which an absolute amount of a knock suppressing substance that is delivered to the combustion chamber may be limited to the rate of separation of the knock suppressing substance from the fuel mixture. Alternatively, the rate at which an absolute amount of a knock suppressing substance that is delivered to the combustion chamber may be limited by a factor of the rate of separation of the knock suppressing substance from the fuel mixture. However, in some embodiments, the absolute amount of knock suppressing substance may not be limited by the separation rate.

In some examples, the control system may be configured to substantially exhaust the knock suppressing substance that is available to the engine before increasing the relative level of propulsive effort provided by the motor. For example, the engine may be operated to provide some or all of the vehicle's propulsive effort, whereby the portion of the motor output is increased responsive to the unavailability of the knock suppressing substance. As another alternative, the control system may be configured to substantially exhaust the energy stored by the energy storage device (e.g. attain a lower threshold SOC) via the motor output portion before increasing the relative level of propulsive effort provided by the engine. In this way, the energy resources available to the motor and the engine may be used in any suitable manner to enable economic use and savings of a particular resource. These and other examples will be described in greater detail with reference to FIG. 7.

It should be appreciated that the graph shown in FIG. 5 may be used to control the hybrid propulsion system in a way that enables battery charging. As one example, the engine output may be increased by operating the engine with a greater boost and with a corresponding increase in the knock suppression ratio during conditions where the level of energy stored by the energy storage device is lower than the prescribed set-point of the energy storage device to enable the motor to be operated as a generator. In this way, the energy storage device may be recharged by additional work provided by the engine via the motor while also providing sufficient propulsive effort as requested by the vehicle operator.

Figure 6:
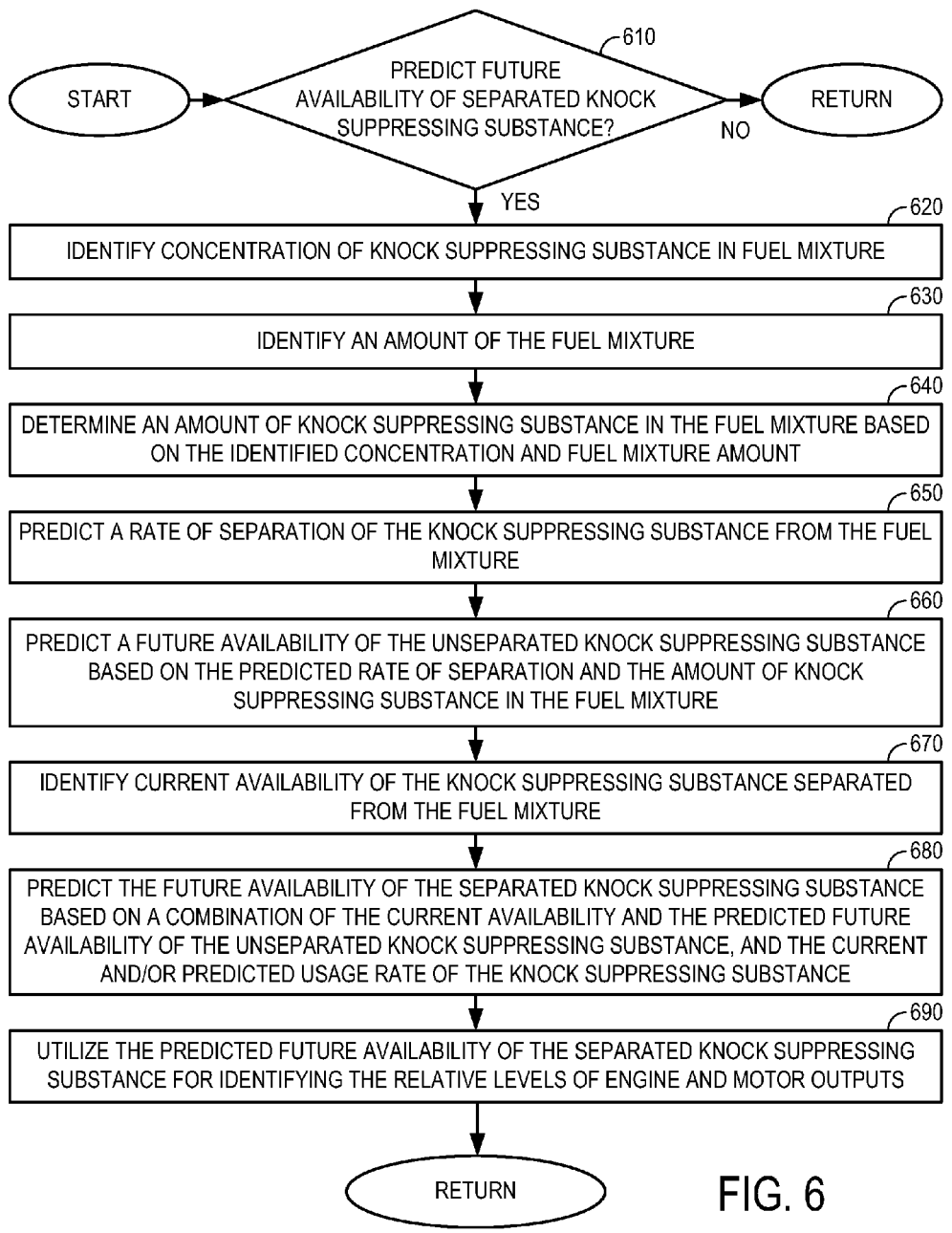
FIG. 6 shows a flow chart depicting an example control strategy for predicting the availability of a knock suppressing substance.

FIG. 6 shows a flow chart depicting an example control strategy for predicting the availability of a knock suppressing substance for use at the engine. The control strategy of FIG. 6 maybe used by the control system to predict the future operating conditions of the hybrid vehicle propulsion system. For example, the amount of knock suppressing substance available for injection at the engine may be predicted at some future time or for a future time range to enable improved usage of the resources available to the engine and motor.

At 610, it may be judged whether to predict the future availability of the separated knock suppressing substance, whereby the predicted future availability may be used to influence the relative level of engine and motor outputs as identified by the control system. If the answer at 610 is yes, the routine may proceed to 620. Alternatively, if the answer at 610 is no, the routine may return.

At 620, the concentration of the knock suppressing substance may be identified in the fuel mixture. For example, the control system may identify a concentration of a knock suppressing substance such as ethanol in a mixture of gasoline and ethanol stored in tank 122 via an ethanol concentration sensor as indicated at 125. At 630, an amount of the fuel mixture may be identified. For example, the control system may identify a fuel mixture level in tank 122 via a fuel mixture level sensor as indicated at 186.

At 640, an amount of the unseparated knock suppressing substance that is contained in the fuel mixture may be determined based on the concentration of the knock suppressing substance identified at 620 and the amount of the fuel mixture identified at 630. Note that in other examples, the control system may instead measure a concentration of other components of the fuel mixture to infer the concentration of the knock suppressing substance contain therein. For example, the control system may instead receive an indication of gasoline concentration from which the ethanol concentration may be inferred.

At 650, a rate of separation of the knock suppressing substance from the fuel mixture via a separator may be predicted. As one example, the control system may utilize a look-up value stored in memory for the rate of separation of the knock suppressing substance for a given concentration of the knock suppressing substance contained in the fuel mixture. For example, the rate of separation may decrease proportionally with decreasing concentration of the knock suppressing substance contained in the fuel mixture. Further, the control system may also adjust the predicted rate of separation to account for other operating conditions. As one example, the predicted separation rate may be reduced with the age of the separator and/or the total amount of knock suppressing substance separated over the life cycle of the separator, or may vary the predicted separation rate with the temperature of the separator or the temperature fuel mixture, among other operating conditions.

At 660, a future availability of separated knock suppressing substance for the currently unseparated knock suppressing substance may be predicted based on the predicted rate of separation and the amount of the unseparated knock suppressing substance contained in the fuel mixture. Note that in the configuration shown in FIG. 1, the control system may also reduce the future prediction by an estimate of the rate of consumption of the fuel mixture containing at least some of the unseparated knock suppressing substance by the engine. However, in other embodiments, where the fuel mixture is separated into two separate tanks for the first substance (e.g. a fuel) and a second substance (e.g. a knock suppressing substance), this correction may be omitted.

At 670, the current availability of the separated knock suppressing substance may be identified. As one example, the control system may identify an amount of knock suppressing substance stored in tank 124 via a tank level sensor as indicated at 188.

At 680, a future availability of the separated knock suppressing substance may be predicted based on a combination of the current availability as identified at 670, current and/or predicted usage rates, and the predicted future availability of the unseparated knock suppressing substance as identified at 660. For example, the control system can reference a look-up table for the given values or can compute the future availability by summing the current availability (e.g. current amount of the separated knock suppressing substance) with the predicted future availability of the currently unseparated knock suppressing substance deducting current and/or predicted usage rates.

At 690, the future predicted availability of the knock suppressing substance identified at 680 may be used to determine the current relative engine and motor outputs for achieving the requested level of propulsive effort. As one example, the control system may utilize the value identified at 690 as an alternative to or in addition to the current availability of the knock suppressing substance to develop a strategy that extends engine boosting and/or utilizes the various energy resources to advantage. In other words, the predicted amount of knock suppressing substance that will be available to the engine at a later time may be considered by the control system when identifying a strategy for delivering the total requested propulsive effort from the combined output of the engine and motor. Finally, the routine may return.

As an example scenario, a refueling operation of the vehicle propulsion may be performed, wherein a fuel mixture is received at a first storage tank (e.g. tank 122). The fuel mixture may include a mixture of gasoline and ethanol, for example. The control system can identify the amount of knock suppressing substance contained in the fuel mixture in the first storage tank prior to separation of the ethanol from the gasoline. The amount of ethanol that will be available to the engine at a future point of time or future time range can be predicted based on the known separation rates and respective usage rates of the gasoline and ethanol. As the vehicle operator begins to drive the vehicle away from the location of refueling, the control system can adjust the relative level of output provided by the engine and the motor for a given level of propulsive effort requested by the vehicle operator. Thus, the control system can vary the knock suppression ratio that is delivered to the engine based on this predicted amount of ethanol that will be available to the engine upon separation. The control system, for example, can increase or decrease the relative rate at which the ethanol is provided to the engine for a given operating condition based on this prediction. Furthermore, as one non-limiting example, the control system can set the maximum ethanol consumption rate by the engine to the ethanol separation rate to extend the availability of ethanol stored on-board the vehicle.

In summary, the approach described with reference to FIG. 6 enables the control system to consider the total amount (e.g. availability) of knock suppressing substance stored on-board the vehicle including the separated portion and unseparated portion; and enables the control system to adjust the usage rate of the knock suppressing substance in consideration of the total amount stored on-board the vehicle, the total amount currently separated, the current and predicted future usage rates of the knock suppressing substance, the unseparated amount, and/or the separation rate.

FIG. 7 shows several graphs depicting various applications of the example control strategies described herein. In each of the examples, the engine and motor outputs are provided for a fixed user input or a fixed total level of requested propulsive effort. Note that these graphs are not necessarily drawn to scale, nor are the relative proportions of the motor and engine outputs necessarily accurately depicted.

Figure 7A:
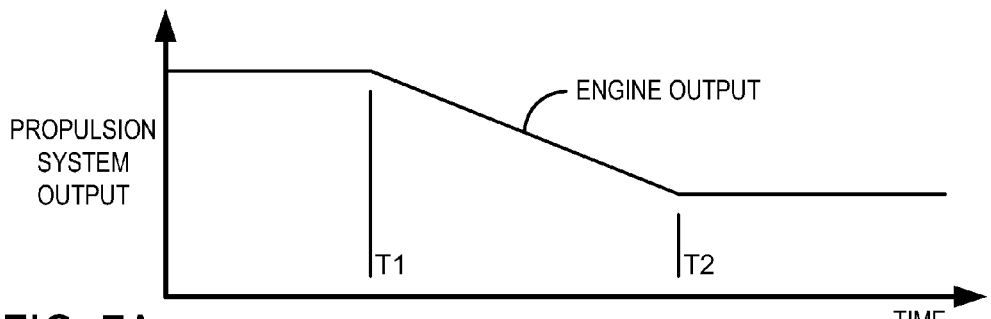
FIG. 7 shows several graphs depicting various applications of the example control strategies described herein.

FIG. 7A shows how engine output may be gradually decreased at time T1 for a given user input as the availability of the knock suppressing substance decreases. Thus, by reducing the rate at which the knock suppressing substance is delivered to the engine over time before the knock suppressing substance is completely exhausted (e.g. at T2), the vehicle operator may be given the opportunity to adjust their driving operations accordingly. In contrast, if the ethanol were permitted to be substantially exhausted before gradually reducing the engine output accordingly, the driver may be surprised by the sudden change in the output of the propulsion system. As another example, the rate of consumption of the knock suppressing substance by the engine may be limited to the separation rate of the knock suppressing substance, thereby reducing sudden changes in the engine performance that may occur if the knock suppressing substance were completely exhausted. Note that these approaches are not necessarily limited to a hybrid propulsion system, but may be utilized with vehicles using non-hybrid engine systems.

Figure 7B:
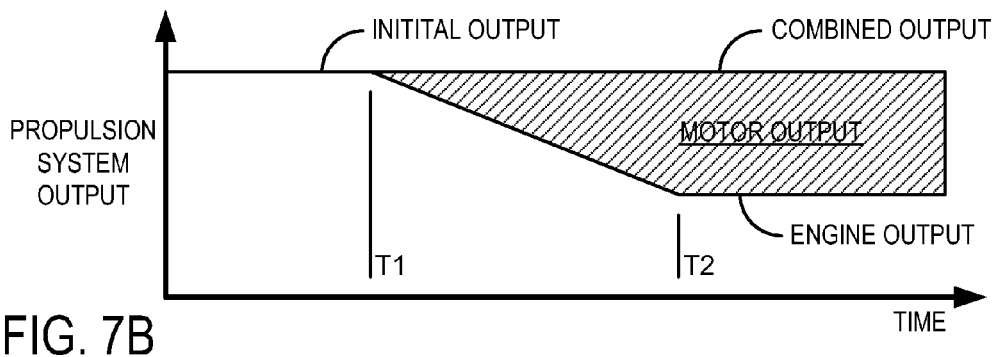

FIG. 7B shows how the operation shown in FIG. 7A may be further improved by operating the motor in response to the reduced engine output to maintain the initial output (e.g. requested level of propulsive effort) of the propulsion system. Thus, by increasing the motor output in response to a gradual reduction in engine output, the combined output of the propulsion system may be controlled so that the vehicle operator experiences a similar level of performance from the vehicle propulsion system. For example, where the availability of the knock suppressing substance is reduced to a particular selected threshold, for example, as indicated at T1, the rate at which the knock suppressing substance is delivered to the engine may be reduced with corresponding reduction in engine boost, while the motor assists in maintaining the initial propulsive effort requested by the vehicle operator.

Figure 7C:
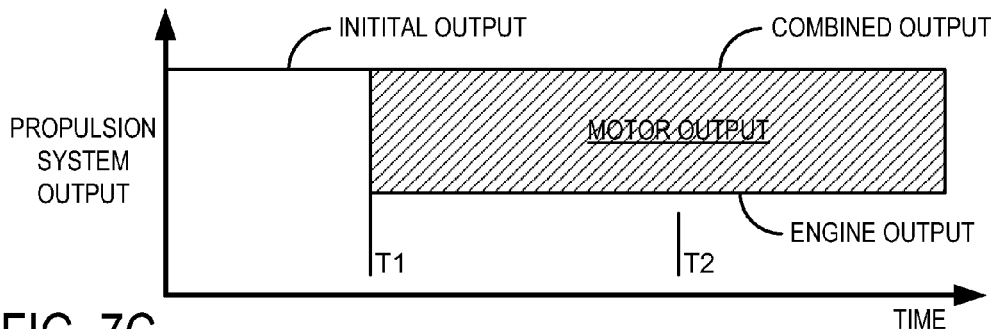

FIG. 7C shows another example, wherein the motor is controlled to respond to a relatively sudden reduction in engine output that may result from a relatively sudden unavailability of the knock suppressing substance. Thus, in this example, the initial output of the propulsion system is maintained by the combined output of the engine and the motor. In this way, the driver may operate the vehicle in a similar manner and experience similar vehicle performance as though the knock suppressing substance has not been exhausted.

Figure 7D:
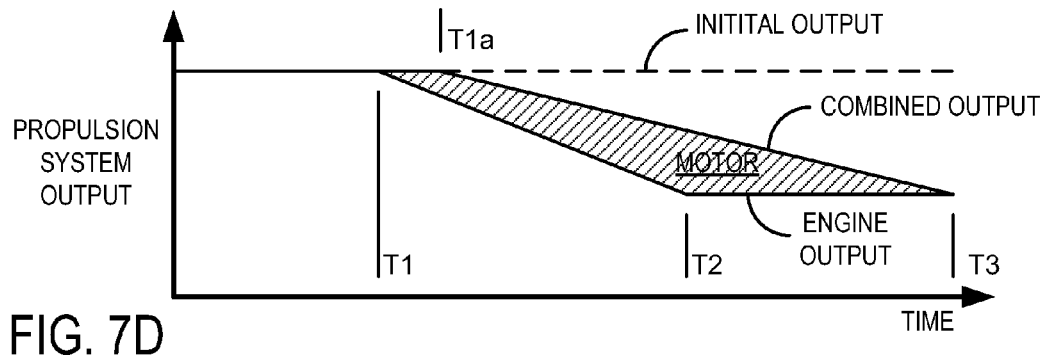

FIG. 7D shows yet another example, wherein the motor output is increased at time T1 in response to a reduction in engine output resulting from reduced availability of the knock suppressing substance. Note that the availability described with each of the examples of FIG. 7 may be based on the current amount of the knock suppressing substance that is available to the engine and/or the future predicted amount of the knock suppressing substance, for example, as identified by the approach of FIG. 6, for example. At time T1a, the motor output may be gradually reduced as the level of energy stored at the energy storage device that is available for powering the motor, decreases. Thus, where the engine output is rapidly reduced at time T1 or gradually reduced over a period between times T1 and T2 responsive to reduced availability of the knock suppressing substance, the motor may be controlled to offset the reduction in engine output. In this way, the combined output of the propulsion system may be maintained at a level that more closely matches the initial output of the propulsion system for a longer period after exhaustion of the knock suppressing substance.

Note that in some examples, the motor may be used to partially offset the loss in engine torque resulting from a reduction in boost due to a reduction in the relative amount of knock suppressing substance (e.g. ethanol) compared to a fuel (e.g. gasoline) that is delivered to the combustion chamber by providing a supplemental torque. Thus, it should be appreciated that the examples shown in FIGS. 7A, 7B, and 7C need not require that the motor provide a supplemental torque that is sufficient to provide a similar combine output to the initial output, but can also provide only a portion of the total reduction in engine output.

While FIG. 7 shows several examples where the motor is utilized to reduce changes in vehicle performance caused by decreasing engine output resulting from reduced availability of the knock suppressing substance, it should be appreciated that the engine may be instead utilized to reduce changes in vehicle performance caused by decreasing motor output resulting from reduced availability of the energy stored within the motor's energy storage device. In this way, the examples of FIG. 7 are applicable to either of these scenarios.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, it should be appreciated that some of the examples described herein may not be limited to a specific hybrid propulsion system configuration nor are they necessary limited to hybrid propulsions systems. For example, some approaches described herein may be applied to engines configured in non-hybrid propulsion systems. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid electric vehicle propulsion system, comprising:
    an internal combustion engine including at least a combustion chamber configured to propel the vehicle;
    an electric motor configured to propel the vehicle;
    a battery coupled to the electric motor;
    a first injector configured to deliver fuel to the combustion chamber;
    a second injector configured to deliver fuel to the combustion chamber;
    a boosting device communicating with the combustion chamber via an air intake passage; and
    a control system configured operate the first and second injector to deliver fuel to the combustion chamber in varying relative amounts responsive to a level of boost provided to the combustion chamber by the boosting device and responsive to a state of charge of the battery, and to vary a level of torque provided by the motor to a drive wheel responsive to the relative amounts.

2. A hybrid propulsion system for a vehicle including at least one drive wheel, the system comprising:
    an engine including at least one combustion chamber;
    a motor configured to selectively propel the vehicle via the drive wheel;
    a fuel system including a first, direct, injector coupled to the combustion chamber and a second, port, injector coupled to the combustion chamber, the first injector configured to deliver a first substance with fuel to the cylinder and the second injector configured to deliver a second substance the fuel a second substance with fuel to the combustion chamber, the fuel system configured to deliver the first and second substances to the combustion chamber in varying relative amounts;
    an energy storage device configured to provide electrical energy to the motor to propel the vehicle via the drive wheel; and
    a control system configured to operate the fuel system to vary the relative amounts of the first substance and the second substance delivered to the combustion chamber while operating the motor to propel the vehicle, the relative amounts varied in response to a state of charge of the energy storage device.

3. The system of claim 2, wherein the control system is further configured to vary a motor output responsive the relative amounts of the first substance and second substance delivered to the combustion chamber.

4. The system of claim 2, wherein the control system is further configured to vary a motor output responsive to an amount of a knock suppressing substance stored on-board the vehicle.

5. The system of claim 2, wherein the first substance includes gasoline, and the second substance includes ethanol.

6. The system of claim 2 further comprising a turbocharger coupled to the engine.

7. The system of claim 2, wherein the motor is an electric motor.

8. The system of claim 2, wherein the control system is further configured to vary a motor output responsive to a storage level of the fuel system.

9. The system of claim 8, further comprising a boosting device coupled to an intake passage communicating with the combustion chamber, wherein the control system is configured to vary a level of boost provided to the combustion chamber by the boosting device responsive to the storage level.

10. A method of operating a hybrid vehicle including an engine, a motor, and a battery, comprising:
    selectively propelling the vehicle via the engine and motor;
    delivering fuel to a cylinder of the engine via a direct injector and a port injector in varying relative amounts responsive to a state of charge (SOC) of the battery; and
    adjusting relative amounts of engine output and motor output responsive to the SOC and a storage level of the fuel system.

11. The method of claim 10 wherein the direct injector delivers a fuel including ethanol to the combustion chamber, and the port injector delivers a fuel including gasoline to the combustion chamber.

12. The method of claim 10 further comprising, varying a level of boost provided to the engine by a boosting device responsive to the relative amounts of fuel provided to the engine from the direct injector and port injector.

13. The method of claim 10, where the fuel is delivered in varying relative amounts to the combustion chamber in response to engine knock.

14. The method of claim 13, further boosting intake air delivered to the combustion chamber.

15. The method of claim 14 further comprising separating gasoline and alcohol from a fuel in the fuel system via a fuel separator.

* * * * *